J. W. Maxey.
Producing Motion for Sawing Mach.
N° 75441. Patented Mar. 10, 1868.
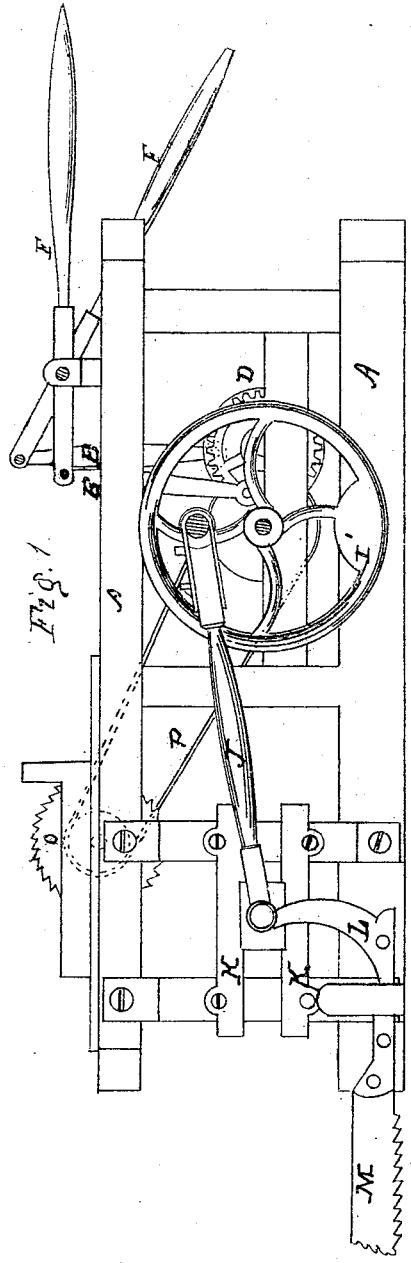
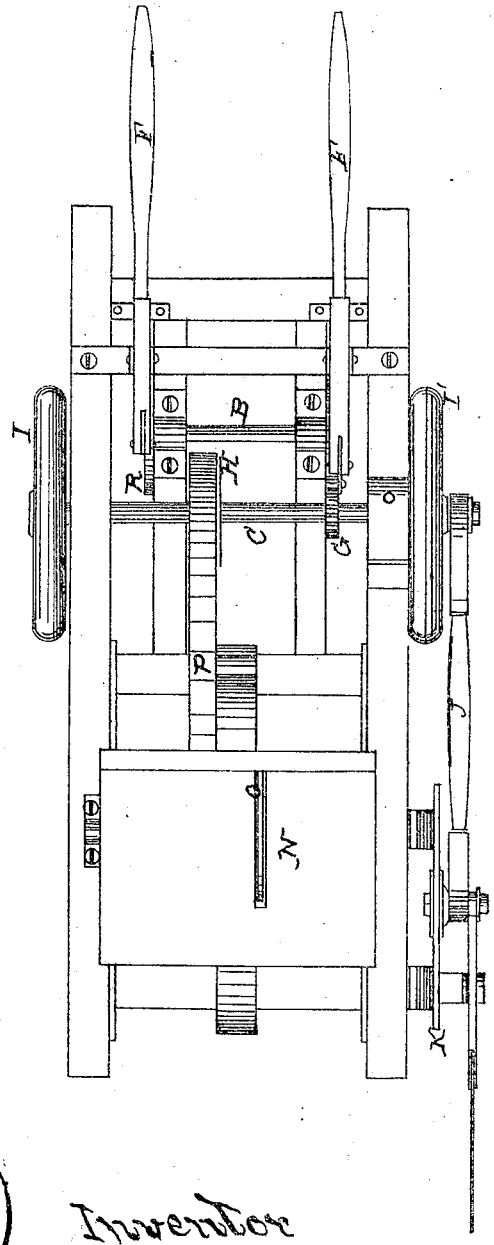
Witnesses
A. A. Yeatman
A. H. Marr
Inventor
James M. Maxey
per
Alexander & Mason
atty

United States Patent Office.

JAMES W. MAXEY, OF PLYMOUTH, INDIANA.

Letters Patent No. 75,441, dated March 10, 1868.

IMPROVEMENT IN MODE OF PRODUCING MOTION FOR SAWING-MACHINES.

*The Schedule referred to in these Letters Patent and making part of the same.*

TO ALL WHOM IT MAY CONCERN:

Be it known that I, JAMES W. MAXEY, of Plymouth, in the county of Marshall, and in the State of Indiana, have invented certain new and useful Improvements in Sawing-Machines; and do hereby declare that the following is a full, clear, and exact description thereof, reference being had to the accompanying drawings, and to the letters of reference marked thereon.

In the annexed drawings, making part of this specification, A represents the frame of the machine, which is made of wood, of any suitable size and strength to withstand the vibrations of a drag or circular saw. Within, and lying in proper bearings across a portion of this frame, is a short shaft, B, which is provided at one end with a gear-wheel, D, and at the other with a plain plate-wheel or crank, R. To the sides, and near the peripheries of these two wheels, are pivoted the pitmen E E. The upper ends of these pitmen are pivoted to the short ends of the levers F F. These levers have their fulcra upon a cross-bar at the top of the frame. C represents a shaft which lies across the frame, with its ends projecting on each side, and upon these ends are secured the balance-wheels I I'. This shaft C is provided with a small gear-wheel, G, which gears into the wheel D, and also with a drum, H, around which passes a band, P, said band passing to and around a drum upon the shaft of the circular saw O, serving to give motion to it. To one of the arms of the wheel I' is connected one end of a pitman, J, the other end of said pitman being connected to a slide which plays between the ways K K. L represents a curved bar which has one of its ends connected to the slide by the same pivot which connects the end of pitman J; and to the other end of said bar is secured a drag-saw, M. The bar L, turning upon its pivot, which connects it to the slide, enables the saw to be placed at any angle desirable for sawing. A table, N, is provided for the circular saw, which may be constructed in any of the usual styles, and which slides upon ways upon top of the frame.

This machine is set and continued in motion by alternately raising and lowering the outer ends of the levers F, which said levers communicate motion to the wheels D and R through their pitmen E E, the wheel D giving motion to shaft C, and through its pitman and drum to the two saws. This machine can be run by hand or power, but is intended as a hand-machine.

This machine can be used for other purposes than sawing, as the power obtained by this arrangement can readily be applied by disconnecting the saws and connecting whatever may be desirable, and to which either a reciprocating or rotary motion may be given.

I am aware that velocipedes and hand-cars are propelled by means of levers, cranks, shafts, and wheels. Such invention I do not claim.

Having thus fully described my invention, what I claim as new, and desire to secure by Letters Patent, is—

The hand-levers F F, operating alternately, and connected to wheels D and R by pitmen E E, and combined with shaft B, wheel G, shaft C, drums H, and balance-wheels I I, when constructed to operate substantially as described.

In testimony that I claim the foregoing, I have hereunto set my hand, this 17th day of July, 1867.

JAMES W. MAXEY.

Witnesses:
W. J. BENNER,
NATHAN MAXEY.